United States Patent [19]

Nilssen

[11] Patent Number: 4,866,757
[45] Date of Patent: Sep. 12, 1989

[54] COMBINED TELEPHONE AND POWER DISTRIBUTION SYSTEM

[76] Inventor: Ole K. Nilssen, Caesar Dr., Barrington Hills, Ill. 60010

[21] Appl. No.: 136,505

[22] Filed: Dec. 23, 1987

Related U.S. Application Data

[63] Continuation of Ser. No. 921,381, Oct. 22, 1986, abandoned.

[51] Int. Cl.⁴ .......................................... H04M 11/00
[52] U.S. Cl. ....................................... 379/90; 379/397
[58] Field of Search ................... 379/387, 90, 58, 110, 379/397, 453, 457

[56] References Cited

U.S. PATENT DOCUMENTS 2,749,429 6/1956 Wavell ................................ 379/453

Primary Examiner—Stafford D. Schreyer

[57] ABSTRACT

From a central point, both telephone signals and Class-2 high frequency electric power are transmitted by way of a common transmission cable to the location of a telephone apparatus; thereby to provide at that location, not only telephone signals, but also a limited amount of electric power useful for various things, such as task lighting. At the central point there is provided a non-interruptible source of electric energy, namely a frequency-converting power supply connected both with an ordinary 120 Volt/60HZ power line as well as with a storage battery. This power supply provides output of Class-2 high frequency voltage. Together with the telephone signals, this Class-2 voltage is transmitted by way of an ordinary telephone installation cable to the location of a telephone apparatus. At that location, some of the wires in the telephone installation cable are connected with the telephone apparatus, and some of the wires in the telephone installation cable are connected with a fluorescent task lighting fixture designed to be properly powered from the Class-2 power-limited high frequency voltage.

29 Claims, 1 Drawing Sheet

COMBINED TELEPHONE AND POWER DISTRIBUTION SYSTEM

This application is a continuation of application Ser. No. 06/921,381, filed 10/22/86, now abandoned.

BACKGROUND OF THE INVENTION

1. Field of Invention

The present invention relates to a system for providing to the location of a telephone apparatus both telephone signals and electric power by way of a single ordinary multi-conductor telephone installation cable.

2. Elements of Prior Art

At many locations where a telephone apparatus is installed, such as at certain telephone booths, electric power is required to provide for desired functions ancillary to the use of the telephone apparatus. A typical such ancillary function is lighting suitable to permit convenient use of the telephone apparatus and of a telephone directory.

In such cases, the telephone signals are transmitted by way of an ordinary multi-conductor telephone installation cable, and ordinary 120 Volt/60 Hz electric power is transmitted by way of a different and completely separate cable.

In view of the National Electrical Code and the requirements of Underwriters Laboratories Inc. (U.L.), it would not be permissible to transmit the ordinary 120 Volt/60 Hz power line voltage along with the telephone signals in an ordinary multi-conductor telephone installation cable.

SUMMARY OF THE INVENTION

Objects of the Invention

A basic object of the present invention is that of providing an improved means for providing electric power to the location of a telephone apparatus.

A more specific object is that of providing by way of an ordinary multi-conductor telephone installation cable, to the location of a telephone apparatus, electric power useful for providing ancillary functions such as lighting.

These, as well as other objects, features and advantages of the present invention will become apparent from the following description and claims.

Brief Description

In its basic preferred embodiment, the present invention consists of the following elements:

(a) at a first location: (i) a set of telephone terminals connected in circuit with an ordinary telephone utility signal line, and (ii) a frequency-converting power supply connected with an ordinary electric utility power line, as well as with a storage battery means, and operative to provide at a set of Class-2 power terminals a 30 Volt/20 Khz current-limited voltage;

(b) at a second location: (i) a telephone apparatus having a set of apparatus terminals, and (ii) a fluorescent ligting means having a set of lighting terminals; and (c) an ordinary multi-wire telephone installation cable having a first set of conductors and a second set of conductors, this telephone installation cable being operative to provide signal and power transmission between the first location and the second location, the first set of conductors being connected with the telephone terminals at the first location and with the apparatus terminals at the second location, the second set of conductors being connected with the Class 2 power terminals at the first location and with the lighting terminals at the second location.

DESCRIPTION OF THE PREFERRED EMBODIMENT

Details of Construction

Figure 1:
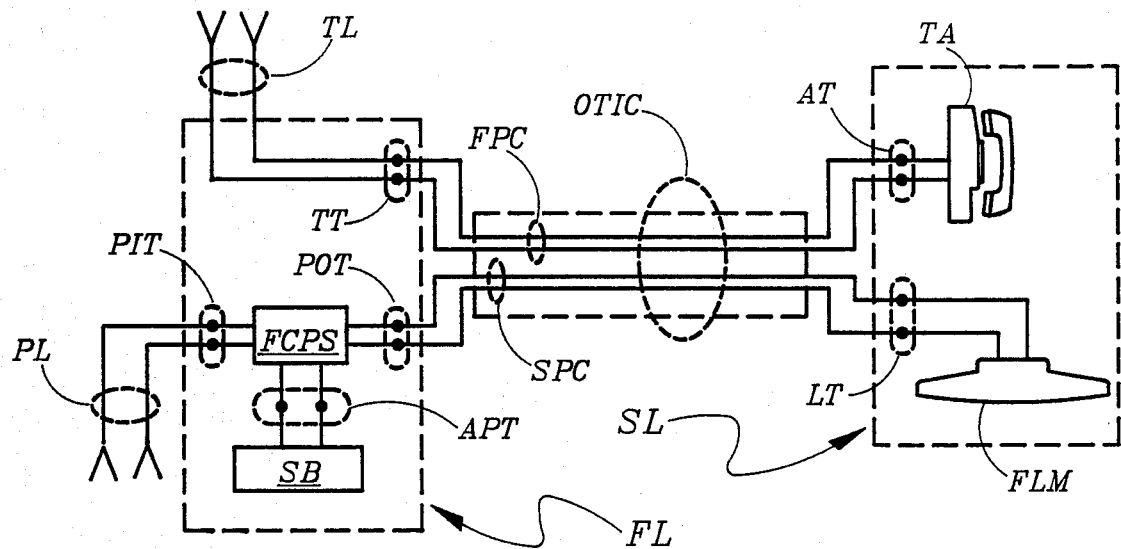
FIG. 1 provides an overall schematic view of the preferred embodiment of the present invention.

FIG. 1 illustrates the overall arrangement of the preferred embodiment of the present invention.

In FIG. 1, a telephone line TL and a power line PL both come into a first location FL and connect with a pair of telephone terminals TT and a pair of power input terminals PIT, respectively.

A frequency-converting power supply FCPS is connected with power input terminals PIT, and provides its output at power output terminals POT. A storage battery SB is connected with frequency-converting power supply FCPS by way of a pair of auxiliary power terminals APT.

At a second location SL, a telephone apparatus has a pair of apparatus terminals AT; and a fluorescent lighting means FLM has a pair of lighting terminals LT.

An ordinary telephone installation cable OTIC has a first pair of conductors FPC and a second pair of conductors SPC. The first pair of conductors is connected between telephone terminals TT and apparatus terminals AT; and the second pair of conductors is connected between power output terminals POT and lighting terminals LT.

Figure 2:
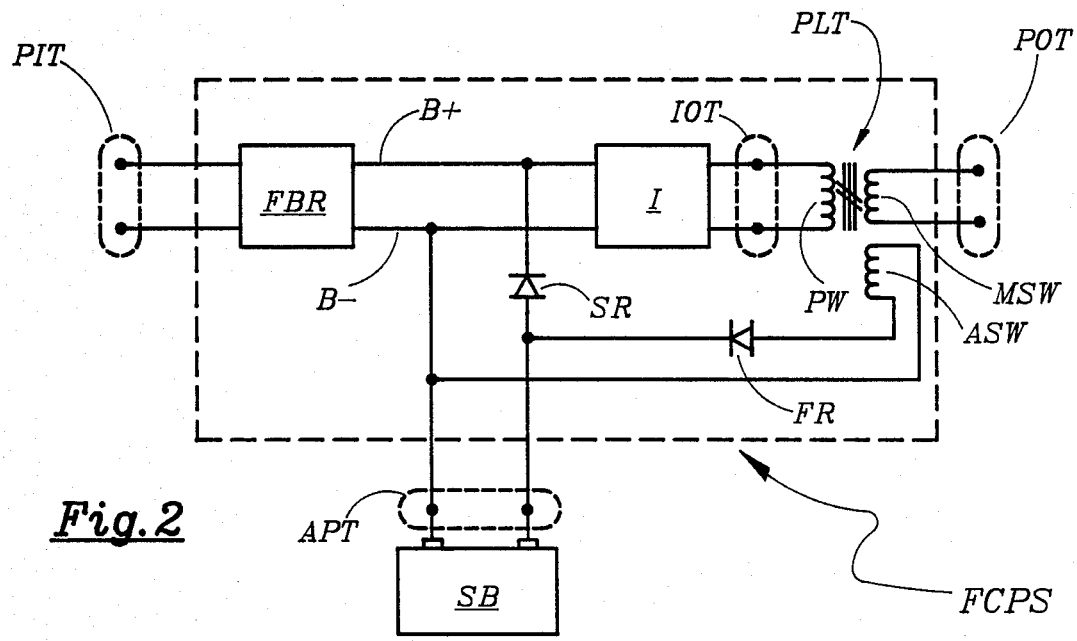
FIG. 2 provides details in respect to the frequency-converting power supply.

FIG. 2 provides details of frequency-converting power supply FCPS and its relationship with storage battery SB.

In FIG. 2, a full bridge rectifier FBR is connected with power input terminals PIT and provides its rectified output voltage between a B+ bus and a B− bus. An inverter I is connected with the B+ bus and the B− bus, and provides an AC voltage at inverter output terminals IOT. A power-limiting transformer PLT has a primary winding PW connected across inverter output terminals IOT, a main secondary winding MSW connected with power output terminals POT, and an auxiliary secondary winding ASW connected between the B− bus and the anode of a first rectifier FR, whose cathode is connected with the anode of a second rectifier SR. The cathode of second rectifier SR is connected with the B+ bus.

Auxiliary power terminals APT are connected with the negative and positive terminals of storage battery SB in such manner that the negative terminal connects with the B− bus and the positive terminal connects with the anode of second rectifier SR.

Figure 3:
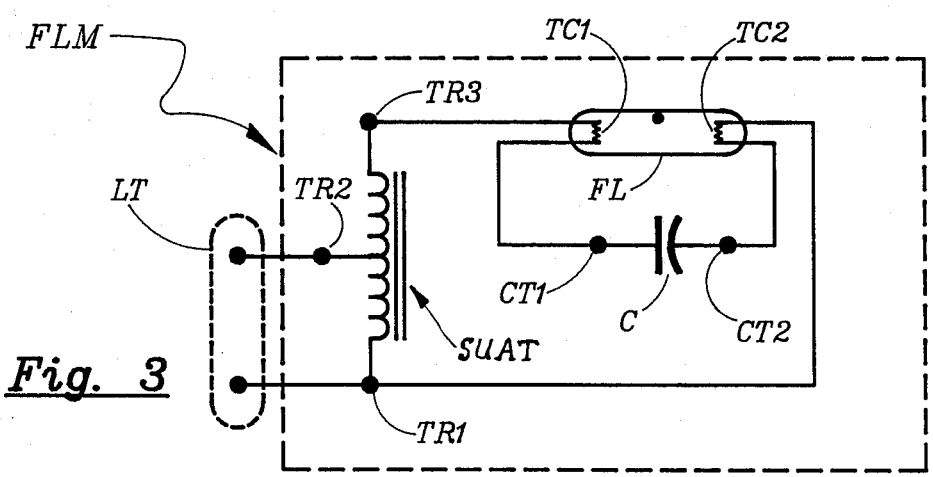
FIG. 3 provides details in respect to the fluorescent lighting means.

FIG. 3 provides details of fluorescent lighting means FLM.

In FIG. 3, a step-up auto-transformer SUAT has three transformer terminals TT1, TT2 and TT3. Transformer terminals TT1 and TT2 are connected with lighting terminals LT. Transformer terminal TT3 is connected with a first capacitor terminal CT1 of a capacitor C by way of a first thermionic cathode TC1 of a fluorescent lamp FL. A second capacitor terminal CT2 of capacitor C is connected with transformer terminal TT1 by way of a second thermionic cathode TC2 of fluorescent lamp FL.

Details of Operation

With reference to FIGS. 1–3, the operation of the preferred embodiment of the invention may be explained as follows.

With frequency-converting power supply FCPS connected with an ordinary 120 Volt/60 Hz power line, a 30 kHz squarewave voltage is provided at inverter output terminals IOT.

The output provided at power output terminals POT is also a 30 kHz voltage. However, due to internal magnetic leakage between primary and secondary windings in power-limiting transformer PLT, the maximum amount of current available from the POT terminals is manifestly and non-dissipatively limited. In particular, the output from the POT terminals is inductively limited in such manner as to meet the specifications in the National Electrical Code for Class 2 electrical circuits.

The output from the POT terminals is connected with a pair of conductors (SPC) in the more-or-less ordinary telephone installation cable OTIC. The telephone line is also connected with a pair of conductors (FPC) in cable OTIC. Thus, both Class 2 electric power as well as ordinary telephone signals are transmitted between the first location (FL) and the second location (SL) by way of an ordinary telephone installation cable (OTIC).

The first location would typically be some central location within a building; and the second location would typically be a telephone booth located some distance away from this building. However, the two locations might also both be located within a single building.

As long as the frequency-converting power supply (FCPS) is being powered by power line voltage from the power line (PL), the storage battery (SB) is being charged from the auxiliary secondary winding (ASW) on the power-limiting transformer (PLT). In the event of power failure, the inverter (I) will be powered from the storage battery; the voltage on which has a magnitude about half that existing between the B+ bus and the B− bus whenever power line voltage is present. Whenever the inverter is being powered by the storage battery, the magnitude of the voltage provided by the ASW winding is too low to cause battery charging.

The 30 Volt/30 kHz voltage provided by the FCPS power supply is transmitted to the fluorescent lighting means (FLM) in the second location (SL), thereby to provide illumination as might be useful in connection with using the telephone apparatus (TA).

In the fluorescent lighting means (FLM), the step-up auto-transformer (SUAT) receives the 30 Volt/30 kHz inductively current-limited voltage from the POT terminals of the FCPS power supply and transforms it to 100 Volt/30 kHz inductively current-limited voltage. In combination with capacitor C, this 100 Volt/30 kHz inductively current-limited voltage is appropriate for starting and powering the fluorescent lamp (FL) by way of series-resonant action.

Additional Comments (a) For further details in respect to frequency-converting power supplies and series-resonant ballasting circuits for fluorescent lamps, reference is made to U.S. Pat. No. Re. 31,758 to Nilssen and U.S. Pat. No. 3,710,177 to Ward.

(b) The series-resonant ballasting circuit described by Ward is especially suitable for powering a fluorescent lamp over a wide range of different driving voltage magnitudes. In particular, reducing the driving voltage magnitude by a factor of two, reduces the lamp light output by less than a factor of two.

(c) If it should happen that the distance between the first location (FL) and the second location (SL) is more than about 100 feet, it is advantageous to reduce the frequency of the driving voltage provided by the frequency-converting power supply (FCPS). In particular, for very large distances, it is anticipated that frequencies as low as 1 kHz may be used.

(d) The maximum amount of power available from the power output terminals (POT) of the frequency-converting power supply (FCPS) is 100 Watt; which is the maximum amount permissible for Class 2 electrical circuits in accordance with the National Electrical Code.

(e) It is expected that, in addition to use in connection with telephone booths and the like, the combined telephone and distribution system of FIG. 1 will find use in homes, offices, and the like; and that both telephone signals and Class 2 electric power will be available by way of ordinary telephone-type receptacle means. In particular, it is anticipated that the output from the frequency-converting power supply (FCPS) be provided at the point in a building from which the telephone signals are distributed, thereby to provide for both telephone signals as well as Class 2 electric power to be distributed by way of a common ordinary multi-conductor telephone cable to multiple locations within the building: typically to the locations where telephone instruments are located.

(f) The National Electrical Code is established by National Fire Protection Association, Batterymarch Park, Quincy, Mass. 02269. Its presently most up-to-date version is provided in a book entitled NATIONAL ELECTRICAL CODE 1984; which book is published by National Fire Protection Association. By reference, this book in general, and Article 725 thereof in particular, is herewith by reference made part of this patent specification.

(g) Article 725 of the National Electrical Code deals with power-limited circuits; which power-limited circuits are designated Class 1, Class 2, and Class 3 circuits.

Class 2 circuits refer to electrical circuits wherein: (i) the maximum voltage available within the circuit is low enough in magnitude to be substantially free from electrical shock hazard to a person coming in direct electrical contact with terminals and/or other elements of the circuit, and (ii) the maximum power available from or within the circuit is low enough to be substantially free of fire initiation hazard in case of an electrical malfunction, such as a short circuit.

Class 3 circuits refer to electrical circuits wherein: (i) the maximum magnitude of any voltage available from or within the circuit is not higher than 150 Volt, and (ii) the maximum power available from or within the circuit is low enough to be substantially free of fire initiation hazard in case of an electrical malfunction, such as a short circuit.

Under most conditions, the continuously available Volt-Ampere product from a Class 2 or Class 3 electrical circuit must be limited to a maximum of 100 Volt- Ampere; which means that the power available is correspondingly limited to a maximum of 100 Watt.

(h) The output from the frequency-converting power supply (FCPS) of FIGS. 1 and 2 is limited in accordance with the specifications in the NATIONAL ELECTRICAL CODE 1984 for Class 2 circuits; which means that it also complies with the specifications for Class 3 electrical circuits. Thus, under most conditions, the Volt-Ampere product available from the POT terminals of the FCPS power supply on a continuous basis may be as high as, but will not exceed, 100 Volt-Ampere.

As indicated in FIG. 2, limitation of Volt-Ampere product output is attained by providing for manifest magnitude-limitation on available output current; which manifest magnitude-limitation is attained by providing for less than 100% coupling between primary winding PW and main secondary winding MSW on power-limiting transformer PLT. Thus, current magnitude-limitation is attained by non-resistive or non-dissipative means.

(i) It is anticipated that glass or optical fiber means may be used instead of ordinary electrical conductors for providing telephone signal transmission between the first location (FL) and the second location (SL); in which case the OTIC cable of FIG. 1 would consist of optical fiber means in combination with electrical conductor means.

Thus, alternatively, the pair of lines labeled FPC in FIG. 1 represent a pair of optical fibers.

(j) The amount of power provided to the fluorescent lighting means (FLM) of FIGS. 1 and 3, is about 40 Watt.

Thus, the amount of power transmitted by way of the electric power transmission path (namely the SPC conductors of FIG. 1) is on the order of many Watt. On the other hand, the amount of power transmitted by way of the telephone transmission path (namely the FPC conductors of FIG. 1) is only on the order of a small fraction of one Watt.

(k) To minimize power losses and/or to permit longer transmission distances, it is anticipated that the SPC conductors of the OTIC cable be made of two or more parallel-connected pairs of the multiple individual conductors present in an ordinary telephone installation cable.

(l) In addition to, or instead of, the fluorescent lighting means (FLM) in FIG. 1, other electric power utilization means may be employed.

Similarly, in addition to, or instead of, the telephone apparatus (TA) of FIG. 1, other telephone signal utilization means may be employed.

For instance, the second location (SL) may harbor a computer terminal connected with the telephone signal transmission means (namely the FPC condustors) as well as with the electric power transmission means (namely the SPC conductors). That way, information transfer may take place by way of the telephone signal transmission means, and Class 2 electrical power transmission for operation of the computer terminal may be provided by way of the electric power transmission means.

(m) A telephone utility signal line is herewith defined as that set of electrical conductors, fiber optic means, or radio link means, used for transmitting telephone and-/or similar signals between the location of a telephone company's facility and the location of a telephone customer.

(n) The amount of electric power available from a telephone utility signal line is on the order of milliwatts.

(o) The amount of electric power available from an ordinary electric power line in a home or office, as by way of an ordinary electric wall receptacle means, is on the order of kilo-watts.

(p) It is believed that the present invention and its several attendant advantages and features will be understood from the preceeding description. However, without departing from the spirit of the invention, changes may be made in its form and in the construction and interrelationships of its component parts, the form herein presented merely representing the presently preferred embodiment.

I claim:
1. An arrangement comprising:
a) at a first location: i) telephone signal terminal means connected with an ordinary telephone utility signal line, and ii) electric power terminal means connected with an ordinary electric utility power line by way of a power conditioning means, the power conditioning means being operative to receive power from the power line and to provide an output at the electric power terminal means that is manifestly limited in respect to the maximum electric power available therefrom;
(b) at a second location: (i) telephone signal utilization means having telephone signal utilization terminal means, and (ii) electric power utilization means having electric power utilization terminal means; and
c) a substantially conventional multi-wire telephone installation cable having a first set of conductors and a second set of conductors, the telephone installation cable being operative to provide telephone signal transmission and electric power transmission between the first location and the second location, the first set of conductors being connected with the telephone signal terminal means at the first location and with the telephone signal utilization terminal means at the second locations, the second set of conductors being connected with the electric power terminal means at the first location and with the electric power utilization terminal means at the second location.

2. The arrangement of claim 1 additionally comprising, at the first location, storage battery means connected in circuit with the power conditioning means and operative to provide operating power thereto in the event of a failure of the ordinary electric utility power line to provide operating power thereto.

3. The arrangement of claim 2 wherein, as long as it is being provided with operating power from the electric utility power line, the power conditioning means is operable to provide battery charging current to the storage battery means.

4. The arrangement of claim 1 wherein the electrical output available from the electric power terminal means is controlled in such manner as to comply with the specifications for Class 3 electrical circuits in accordance with Article 725 of NATIONAL ELECTRICAL CODE 1984.

5. The arrangement of claim 1 wherein the electrical power output available from the electric power terminal means is limited to such a degree as to be substantially free of fire initiation hazard.

6. The arrangement of claim 1 wherein the telephone signal utilization means is a telephone apparatus.

7. The arrangement of claim 1 wherein the electric power utilization means is a fluorescent lighting means.

8. The arrangement of claim 1 wherein a telephone booth is located at the second location, the telephone booth being operative to support the telephone signal utilization means and the electric power utilization means.

9. The arrangement of claim 1 wherein the second set of conductors is electrically non-coupled with the telephone utility signal line.

10. The arrangement of claim 1 wherein the second location is located a substantial distance away from the first location, a substantial distance being a distance in excess of ten feet.

11. The arrangement of claim 1 wherein the substantially conventional multi-wire telephone installation cable is further characterized by being comprised of plural individually insulated conductors being contained within a common outer covering.

12. The arrangement of claim 1 wherein the power conditioning means comprises frequency-converting power supply means operative to convert the voltage provided from the ordinary electric utility power line to a voltage having a frequency substantially higher than that of the voltage on the ordinary electric utility power line.

13. The arrangement of claim 1 wherein there is electrical isolation between the electric power terminal means and the power line.

14. The arrangement of claim 1 wherein the power conditioning means is operative to limit the maximum electric power available from the electric power terminal means in a substantially non-power-dissipative manner.

15. The arrangement of claim 1 wherein: (i) the amount of power available from the electric power terminal means is substantially higher than one Watt, and (ii) the amount of power available from the telephone signal terminal means is substantially less than one Watt.

16. The arrangement of claim 1 wherein: (i) the amount of power available from the electric power terminal means is on the order of ten Watt or more, but not more than about 100 Watt, and (ii) the amount of power available from the telephone signal terminal means is substantially less than one Watt.

17. The combination of:
first means comprising:
(i) telephone signal terminal means connected in circuit with an ordinary telephone utility signal line; and
(ii) electric power terminal means connected in circuit with an ordinary electric utility power line by way of power conditioning means operative to control the electric power output from the electric power terminal means in such manner as to be substantially free of fire initiation hazard in case of malfunction;
second means comprising:
(i) telephone signal utilization means having telephone signal utilization terminals, and
(ii) electric power utilization means having electric power utilization terminals; and
third means comprising:
substantially conventional multi-conductor telephone installation cable having a first set of conductors and a second set of conductors;
the telephone installation cable being operative to provide telephone signal transmission and electric power transmission between the first means and the second means, the first set of conductors being connected between the telephone signal terminal means and the telephone signal utilization terminals, the second set of conductors being connected between the electric power terminal means and the electric power utilization terminals.

18. The combination of claim 17 wherein the power conditioning means is further characterized by being operative to cause the electric output from the electric power terminal means to be of a frequency substantially higher than that of the voltage on the ordinary electric utility power line.

19. The combination of claim 18 wherein the first means is located at a first location and the second means is located at a second location, the first location being removed from the first location by a distance of about ten feet or more.

20. The combination of:
first means comprising:
(i) telephone signal terminal means connected in circuit with a telephone utility signal line; and
(ii) electric power terminal means connected in circuit with an ordinary electric utility power line by way of power conditioning means operative to control the electric output from the electric power terminal means in such manner as to be substantially free of fire initiation hazard in case of malfunction;
second means comprising:
(i) telephone signal utilization means having telephone signal utilization terminal means, and
(ii) electric power utilization means having electric power utilization terminal means; and
third means comprising:
telephone installation cable means having telephone signal transmission means and electric power transmission means, there being substantially no coupling between the telephone signal transmission means and the electric power transmission means; the telephone installation cable means being operative to provide telephone signal transmission and electric power transmission between the first means and the second means, the telephone transmission means being connected between the telephone signal terminal means and the telephone signal utilization terminal means, the power transmission means being connected between the electric power terminal means and the electric power utilization terminal means.

21. The combination of claim 20 wherein the electric output from the electric power terminal means is controlled in such manner as to permit continuous electric power drain therefrom as high as, but not higher than, about 100 Watt.

22. The combination of claim 21 wherein the conditioning means is operative to make the frequency of the electric output from the electric terminal means higher than that of the voltage on the ordinary electric utility power line.

23. An arrangement comprising:
(a) at a first location: (i) telephone signal terminal means connected with an ordinary telephone utility signal line, and (ii) electric power terminal means connected with an ordinary electric utility power line by way of a power conditioning means, the power conditioning means being operative to receive power from the power line and to provide an output at the electric power terminal means that is manifestly limited in respect to the maximum electric power available therefrom;

(b) at a second location: (i) telephone signal utilization means having telephone signal utilization terminal means, and (ii) electric power utilization means having electric power utilization terminal means; and (c) a multi-wire cable having a first set of conductors and a second set of conductors, the multi-wire cable being operative to provide telephone signal transmission and electric power transmission between the first location and the second location, the first set of conductors being connected with the telephone signal terminal means at the first location and with the telephone signal utilization terminal means at the second locations, the second set of conductors being connected with the electric power terminal means at the first location and with the electric power utilization terminal means at the second location.

24. The combination of:

first means comprising:
(i) telephone signal terminal means connected in circuit with an ordinary telephone utility signal line; and
(ii) electric power terminal means connected in circuit with an ordinary electric utility power line by way of power conditioning means operative to control the electric output from the electric power terminal means in such manner as to be substantially free of fire initiation hazard in case of malfunction;

second means comprising:
(i) telephone signal utilization means having telephone signal utilization terminals, and
(ii) electric power utilization means having electric power utilization terminals; and third means comprising:
multi-conductor installation cable having a first set of conductors and a second set of conductors;
the installation cable being operative to provide telephone signal transmission and electric power transmission between the first means and the second means, the first set of conductors being connected between the telephone signal terminal means and the telephone signal utilization terminals, the second set of conductors being connected between the electric power terminal means and the electric power utilization terminals.

25. The combination of:
first means comprising:
(i) telephone signal terminal means connected in circuit with a telephone utility signal line; and
(ii) electrical power terminal means connected in circuit with an ordinary electric utility power line by way of power conditioning means operative to control the electric output from the electric power terminal means in such manner as to be substantially free of fire initiation hazard in case of malfunction;

second means comprising:
(i) telephone signal utilization means having telephone signal utilization terminal means, and
(ii) telephone power utilization means having electric power utilization terminal means; and third means comprising:
installation means having telephone signal transmission means and electric power transmission means, there being substantially no coupling between the telephone signal transmission means and the electric power transmission means;
the installation means being operative to provide telephone signal transmission and electric power transmission between the first means and the second means, the telephone transmission means being connected between the telephone signal terminal means and the telephone signal utilization terminal means, the power transmission means being connected between the electric power terminal means and the electric power utilization terminal means.

26. Near the location of a telephone apparatus, the arrangement comprising:
(a) first terminal means connected in circuit with a telephone signal source and operative to permit connection between the telephone apparatus and the telephone signal source; and
(b) second terminal means connected in circuit with an ordinary electric utility power line by way of power conditioning means, the second terminal means being operative to permit the connection thereto of a utilization means, thereby to provide a utilization voltage to the utilization means, the power conditioning means being operative to limit the magnitude of the maximum power output available from the second terminal means to a level that is regarded as being substantially safe from fire initiation hazard.

27. The arrangement of claim 26 actually combined with the utilization means, which utilization means comprising a lighting means.

28. The arrangement of claim 26 wherein the power conditioning means includes non-dissipative current-limiting means operative to limit the magnitude of the maximum power available from the second terminal means.

29. The arrangement of claim 26 wherein the utilization voltage has a frequency that is substantially higher than that of the voltage on the ordinary electric utility power line.

* * * * *